(12) United States Patent
McClintic

(10) Patent No.: US 6,902,402 B2
(45) Date of Patent: Jun. 7, 2005

(54) FLIGHT SIMULATOR

(75) Inventor: Frank McClintic, Toms River, NJ (US)

(73) Assignee: MaxFlight Corporation, Toms River, NJ (US)

( * ) Notice: Subject to any disclaimer, the term of this patent is extended or adjusted under 35 U.S.C. 154(b) by 0 days.

(21) Appl. No.: 10/441,444

(22) Filed: May 20, 2003

(65) Prior Publication Data

US 2003/0219702 A1 Nov. 27, 2003

Related U.S. Application Data

(60) Provisional application No. 60/382,473, filed on May 22, 2002.

(51) Int. Cl.[7] .............................. G09B 9/02; G09B 19/16
(52) U.S. Cl. ............................... 434/30; 434/38; 434/55
(58) Field of Search ............................. 434/30, 38, 55, 434/29, 37, 43, 47, 58; 472/30, 32, 59, 60, 130, 44, 45, 28

(56) References Cited

U.S. PATENT DOCUMENTS

| | | | | |
|---|---|---|---|---|
| 1,987,004 A | * | 1/1935 | Eyerly | 472/44 |
| 2,357,481 A | * | 9/1944 | Mallon | 434/55 |
| 2,362,190 A | | 11/1944 | Cortes | |
| 2,687,580 A | * | 8/1954 | Dehmel | 434/55 |
| 3,196,557 A | * | 7/1965 | Davidsen et al. | 434/55 |
| 4,019,261 A | * | 4/1977 | Pancoe | 434/58 |
| 4,710,128 A | * | 12/1987 | Wachsmuth et al. | 434/46 |
| 4,898,377 A | * | 2/1990 | Roche | 472/30 |
| 5,051,094 A | * | 9/1991 | Richter et al. | 434/30 |
| 5,353,242 A | * | 10/1994 | Crosbie et al. | 703/8 |
| 5,388,991 A | * | 2/1995 | Morris | 434/55 |
| 5,453,011 A | * | 9/1995 | Feuer et al. | 434/38 |
| 5,685,718 A | * | 11/1997 | McClintic | 434/38 |
| 5,791,903 A | * | 8/1998 | Feuer et al. | 434/38 |
| 5,827,065 A | * | 10/1998 | McClintic | 434/29 |
| 6,050,823 A | * | 4/2000 | McClintic | 434/29 |
| 6,331,152 B1 | | 12/2001 | Holle | |

* cited by examiner

Primary Examiner—Jessica Harrison
Assistant Examiner—Dmitry Suhol
(74) Attorney, Agent, or Firm—Michael P. Straub; Straub & Pokotylo

(57) ABSTRACT

Flight simulator with the ability to subject a passenger in a passenger compartment to sudden and possibly substantial horizontal and vertical thrusts in addition to a full 360 degrees of motion along a pitch, roll and yaw axes is described. In some embodiments, sustained G forces are also possible by mounting the passenger compartment in a support arm which includes an additional boom around which the passenger compartment is rotated to provide sustained acceleration to passenger compartment occupants.

13 Claims, 5 Drawing Sheets

FLIGHT SIMULATOR

RELATED APPLICATIONS

The present application claims the benefit of U.S. Provisional Patent Application Ser. No. 60/382,473 filed May 22, 2002 titled "IMPROVED FLIGHT SIMULATOR" which is hereby expressly incorporated by reference.

BACKGROUND

Flight simulators have been in use for several years. U.S. Pat. No. 5,685,718 describes a flight simulator which supports movement of a passenger compartment along a pitch, a roll and a yaw axes. Such simulators bring a high degree of realism to the flight simulation experience.

Given the high cost of actual flight time and the relative safety of using a flight simulator for training purposes, there is an increasing demand for realistic flight simulators which can be used to train civilian as well as military pilots. Flight simulators of the type described in U.S. Pat. No. 5,685,718 provide reasonably realistic simulations of routine flight conditions. However, such simulators may fail to provide a realistic sense of sudden turbulence such as the type that may be encountered in the case of wind sheer and other unexpected and often extremely challenging flight conditions. Such flight simulators also suffer from a limited ability to simulate sustained G forces in excess of one G which may be encountered, e.g., during actual combat conditions.

Accordingly, there is a need for improved flight simulators that can more realistically simulate difficult flight conditions including sudden changes in aircraft elevation due to unexpected turbulence. There is also a need for a flight simulator that can subject a simulation participant to sustained G forces in excess of 1 G while still providing a reasonably accurate simulation of other flight characteristics.

SUMMARY OF THE INVENTION

The present invention improves upon known flight simulator designs by providing a flight simulator with the ability to subject a passenger in a passenger compartment to sudden and possibly substantial horizontal and vertical thrusts in addition to a full 360 degrees of motion along a pitch, roll and yaw axes.

Vertical acceleration is accomplished by using a vertical actuator to control the height (elevation) of pitch boom during flight simulation. A swing boom to which a passenger compartment is attached is mounted so that it can rotate fully about the pitch boom during flight simulations. By adjusting the height of the pitch boom, in a sudden fashion, during a flight simulation sudden losses or gains in altitude, e.g., due to wind sheer or other extreme conditions, can be simulated. To insure that the passenger compartment attached to the swing boom can rotate fully around the pitch axis during simulations, the support assembly is designed that it is tall enough that the passenger compartment will remain above the ground during the full time of a simulation. The passenger compartment and pitch boom may be lowered to the ground for easy loading and exiting of the passenger compartment but, during a flight simulation, remains above the ground so to that it can rotate freely.

Sudden changes in horizontal position are achieved by attaching a horizontal actuator to a horizontal support which is movable in the horizontal direction. The horizontal support may be, e.g., a platform, mounted on wheels which ride on tracks. The tracks serve to guide the flight simulator systems in a horizontal direction when the horizontal actuator causes the support platform to move during a flight simulation.

In the above described manner, by adding horizontal and vertical actuators to a flight simulator, sudden changes in horizontal and vertical position can be simulated during a flight simulation adding an additional degree of realism beyond the 360 degrees of motion supported in the pitch, roll and yaw directions.

In another embodiment, in addition to adding the ability to support sudden changed in horizontal and vertical position, the flight simulator of the present invention adds yet another degree of realism by mounting the flight simulator on the end of the swing boom in a support art. An additional boom supports the passenger compartment in the support arm. A motor is provided to rotate the additional boom, and thus the passenger compartment along the additional axis, referred to as the G axis. Passengers sit forward from the additional boom in the passenger compartment so that, as the passenger compartment is rotated around the G axis they are subjected to sustained acceleration, e.g., multiple G forces. Since the arm in which the additional boom and passenger compartment are mounted is fully rotatable in the pitch, roll, and yaw axis, the ability to support sustained G-forces is obtained without otherwise restricting passenger compartment movement. In fact, sudden horizontal and vertical motion is also supported in this simulator embodiment.

DETAILED DESCRIPTION

The present invention improves upon known flight simulator designs by providing a flight simulator with the ability to subject a passenger in a passenger compartment to sudden and possibly substantial horizontal and vertical thrusts in addition to a full 360 degrees of motion along a pitch, roll and yaw axes. It also allows, in some embodiments, a passenger in the simulator's passenger compartment to be subjected to sustained multiple G forces.

Figure 1A:
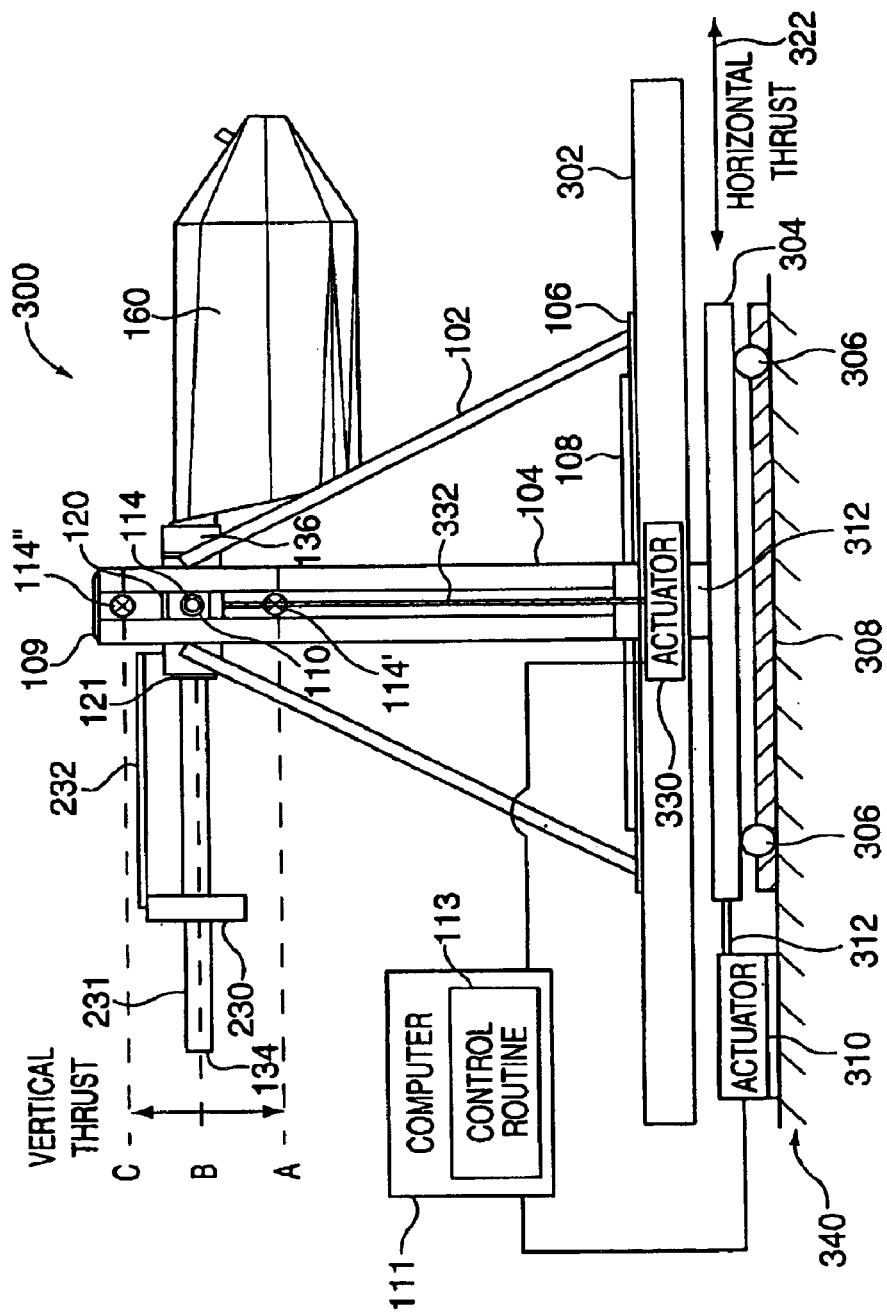
FIG. 1A illustrates a flight simulator implemented in accordance with an embodiment of the present invention which supports sudden changes in elevation and rapid movements along a horizontal axes in addition to motion along pitch, roll and yaw axes.
Figure 1B:
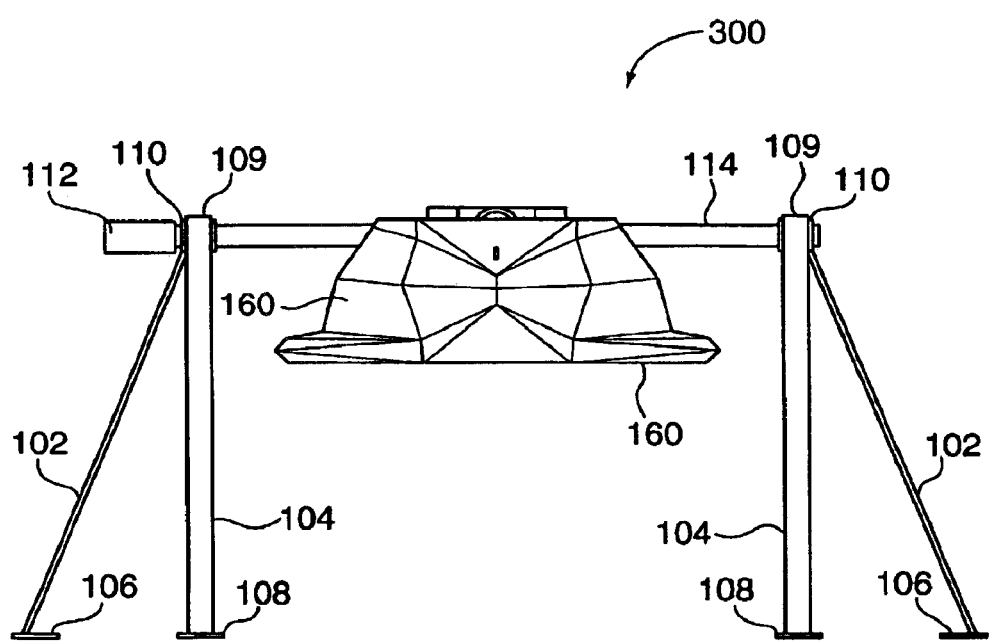
FIG. 1B is a frontal vie of a portion of the flight simulator shown in FIG. 1A.

FIG. 1A illustrates a flight simulator system 300 implemented in accordance with one embodiment of the present invention including a passenger compartment 160 shown in an inverted position. FIG. 1B illustrates the upper portion of the flight simulator of FIG. 1A as viewed from the front and with the top of the passenger compartment 160 removed and with the compartment 160 in the non-inverted seating position. The same reference numbers are used in FIGS. 1A and 1B to refer to the same elements.

As illustrated, the system 300 includes a support assembly comprised of support frames 102 and side frames 104, which rest upon plates 106, 108, respectively. The side frames 104 terminate at and support pedestals 109. The pedestals 109 and their associated supports are spaced apart, and in turn support, two pitch bearings 110 which provide a rotating support to pitch boom 114 which lies along a pitch axis. One of the pedestals 109 also supports a pitch motor 112 (see FIG. 1B), which is adapted to drive the pitch boom 114 around the pitch axis. The pitch motor 112 may be driven electrically or hydraulically under computer control, e.g., under control of computer 111 and control routine 113. Pitch boom 114 supports hub 120 which supports swing boom 134 such that the swing boom 134 lies along a roll axis that is perpendicular to the pitch boom and pitch axis. The hub 120 rotates with the pitch boom and includes a roll motor 121 and roll bearings which permit the swing boom 134 to be rotated about the roll axis by the roll motor 121.

One end 136 of the swing boom 134 supports a passenger compartment, e.g., cockpit assembly 160. A counterweight 230 is slidably connected to move along a second section of swing boom 134. The counterweight 230 serves as a counter balance to passenger compartment 160 and can be slide to provide for adjustments intend to compensate for variations in the weight of the passenger compartment 160 due to the presence of different weight occupants at different times. Counterweight drive assembly 232 is interspersed between the counterweight and the pitch boom 114 to provide a mechanism for adjusting the position of counterweight 230.

In the FIG. 1 illustration the cockpit assembly is shown in an inverted position subjecting occupants included therein to negative G forces. The cockpit assembly may comprise: a seat for a trainee, input controls such as a joystick, a wheel, buttons, instruments, weapons controls, and visual displays, etc. The cockpit may also include a lid or cover so that it can be closed for flight simulation purposes. The pitch boom can be raised and lowered by vertical activator 330 which drives linkage 332 to raise and/or lower the pitch boom 114.

Plates 106, 108 rest on platform 302 which in turn is supported by yaw motor 312 and base 304. Yaw motor 312 drives platform 302, under computer control, around the yaw axis. Platform 302 includes vertical actuator 330 used to drive linkage 332 which supports pitch boom 114 and, in turn, hub 120, boom 134 and passenger compartment 160. Vertical actuator 330 is securely mounted in platform 302 so that is remains fixed as it drives linkage 332 to raise and lower pitch boom 114 and thus cockpit 160. Vertical actuator 330 may be implemented using an electric motor, hydraulic motor and/or some other known motion inducing device. Drive linkage 332 may be, e.g., a screw drive in the case of an electric motor actuator or a piston rod in the case of a hydraulic motor actuator, or a cable drive system including one or more cables and pulleys.

The pitch boom 114 may be raised and lowered by vertical actuator 330. For example, it can be lowered to allow easy passenger entry into the cockpit assembly 160 and then raised to initial starting position B at which point the simulation may begin. Position C indicates the maximum height to which pitch boom 114 may be raised during simulator operation while position A represents the normal low point of pitch boom 114 during a simulation. Position A is sufficiently high above platform 302 to permit full rotation of the passenger compartment around the pitch axis during a simulation. Reference 114' shows the position of the pitch boom when at lower level A while 114" shows the position of the pitch boom when at upper level C.

Under computer control, e.g., under control of computer 111, vertical actuator will suddenly raise and lower the swing boom 114, e.g., to simulate rapid changes in aircraft elevation due to turbulence or other conditions, during a flight simulation. Vertical acceleration achieved by actuator 330 is, in one embodiment, as much as 30 inches per second. In one such embodiment, the distance between elevations A and C is 15 feet allowing for as much as 6 seconds of maximum vertical acceleration at a time. For various applications faster acceleration rates may be supported. The distance and vertical acceleration rate discussed are exemplary and may vary depending on the implementation.

The ability to support sudden horizontal thrusting motion is achieved as illustrated in FIG. 1, by mounting the base 304 in a fashion that allows the flight simulator passenger compartment 160 and related supporting structures to be moved by a horizontal actuator 310 in a horizontal direction during operation. Accordingly, in the FIG. 1 embodiment, the passenger compartment and any occupants included therein can be subject to sudden motion in a horizontal direction while, at the same time the passenger compartment 160 is subjected to motion along a pitch, a roll and/or a yaw axes and, optionally, subject to sudden vertical acceleration.

In FIG. 1, the base 304 is mounted on wheels 306 which allow the simulator 300 to roll along rails 308 in response to horizontal actuator 310 extending and/or retracting linkage 312. Rails 308 serve as a guide to restrict motion in the horizontal thrust direction in response to movement of linkage 312. Linkage 312 connects the actuator 310 to base 304. The wheel and rail mounting arrangement is merely exemplary of one arrangement for slidably mounting the passenger compartment support assembly including base 302, plate 106 and supports 102 in a manner that allows horizontal motion. Base 304 may be mounted in a manner that allows the base 304 to slide along rails 308 without the benefit of the rolling action provided by wheels 306. Guides other than rails 308 may be used to restrict horizontal motion.

Horizontal actuator 310 is secured to ground 340 upon which the rails 308 rest. Actuator 310 may be implemented as an electric motor, hydraulic motor or a variety of other motion inducing devices. Horizontal actuator 310 is of sufficient size to produce sudden movements, as represented by arrow 322, of the flight simulator's passenger compartment support assembly and passenger compartment 160 during operation. In one embodiment, horizontal thrust at rates of up to 30 feet per second are supported. However, other thrust rates are possible. In some embodiments, horizontal travel distances of several feet are supported by the rails 308 permitting a fair amount of sudden horizontal motion. Various horizontal travel distances may be supported depending on the implementation.

Figure 2A:
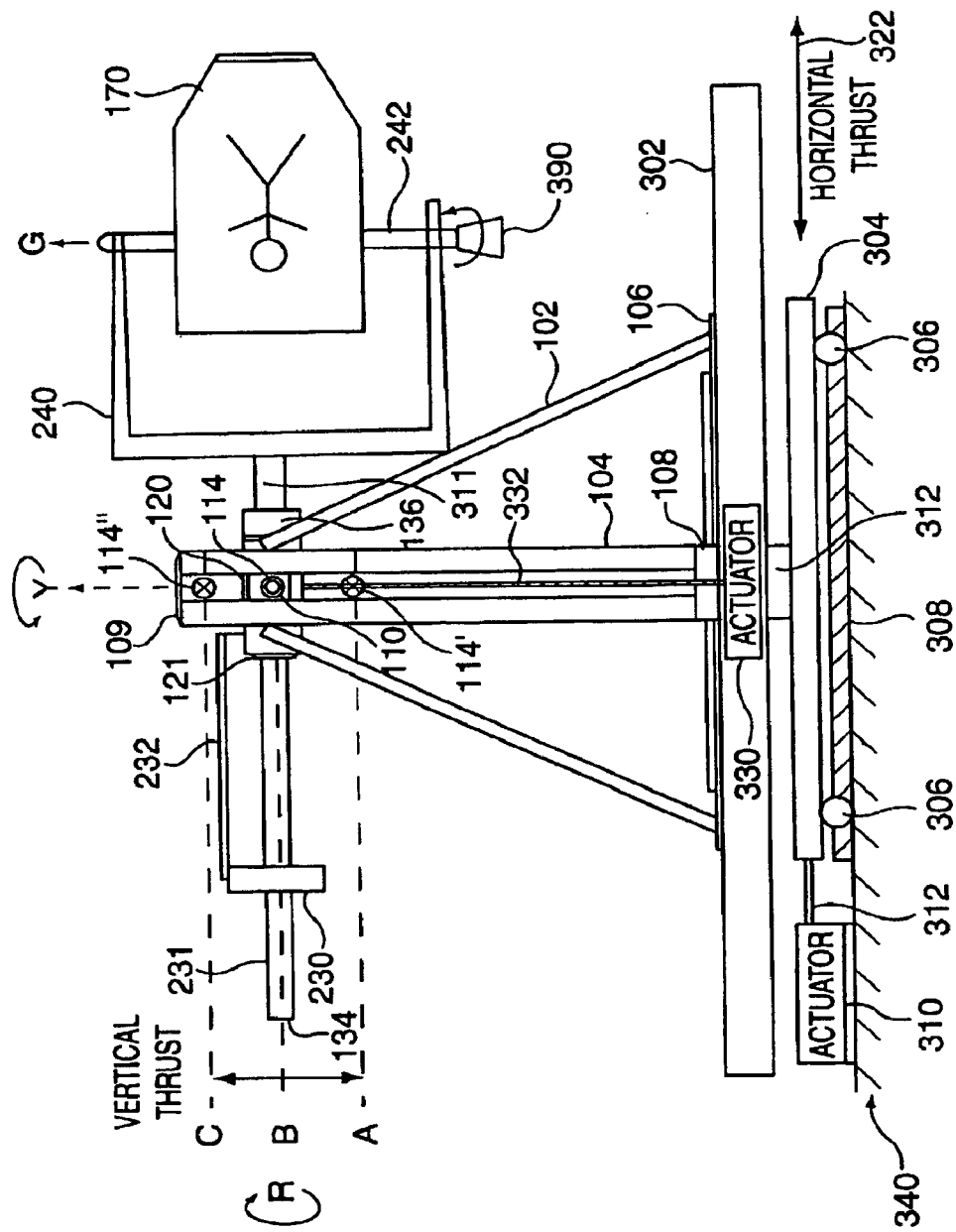
FIGS. 2A–2C illustrate a flight simulator, in various operating positions, implemented in accordance with another embodiment of the present invention which supports motion along pitch, roll and yaw axes in addition to the ability to subject a passenger in the simulator's passenger compartment to sustained multiple G forces.

FIG. 2A illustrates an embodiment where the passenger compartment is secured to an additional boom 242 extending along an additional boom axis G. Support arm 240 is secured to swing boom 134 by swing boom section 210. A motor 395 is attached to boom 242 which, under computer control, causes the boom 242 and passenger compartment 160 to tilt and/or rotate around axis G as part of a flight simulation. The additional boom 242 is mounted in a support arm 240 by a set of bearings which allow the passenger compartment 170 to rotate around the axis G. Passenger compartment 170 is offset from the yaw access subjecting the passenger in the passenger compartment 170 to acceleration as the passenger compartment 170 is rotated along with the swing boom 134 around the yaw axis. In the FIG. 2A position, the arm 240 is shown tilted to the side in a roll position. Depending on the speed of rotation a passenger may be subject to multiple G forces on a sustained basis without restricting motion around the pitch, yaw or roll axis.

Furthermore, through the use of actuators 340, 330 passengers can be subjected to rapid horizontal and vertical thrusting motion in addition to sustained G forces. Accordingly, the flight simulator shown in FIG. 2 supports full roll, yaw and pitch motion while also allowing a passenger to be subjected to multiple G force for extended periods of time in addition to rapid changes in elevation and horizontal thrusting.

Figure 2B:
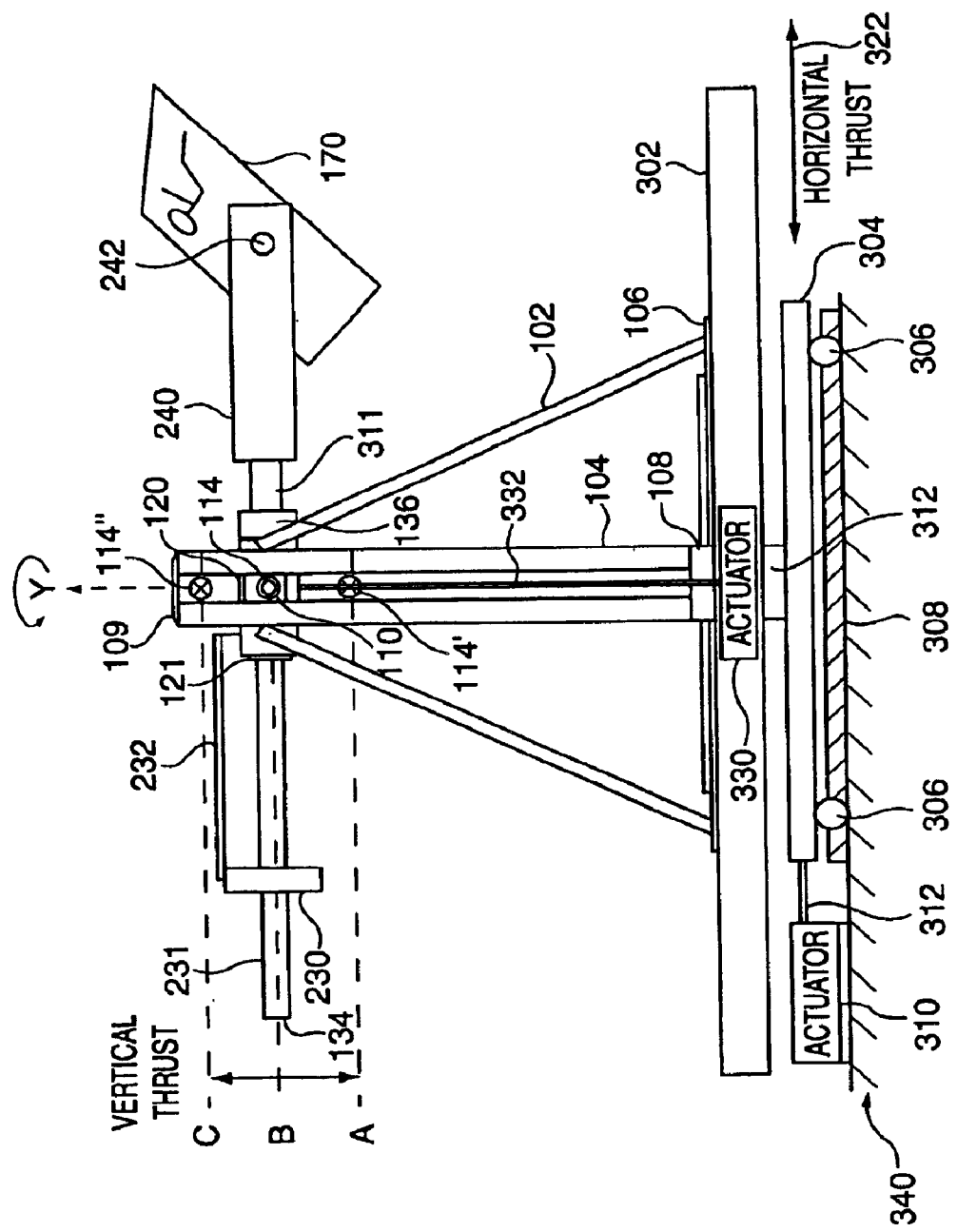
Figure 2C:
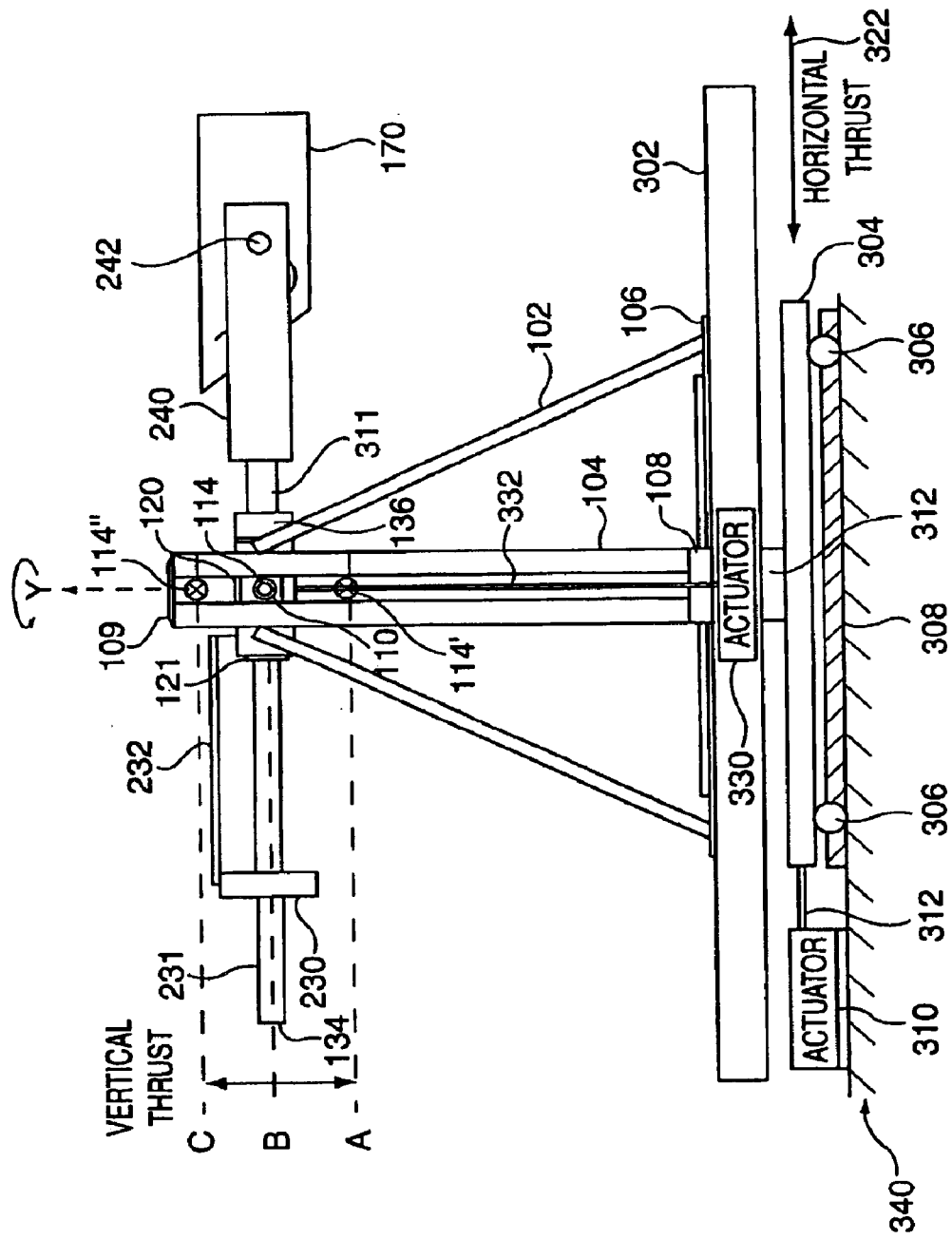

FIG. 2B illustrates the passenger compartment 170 in a simulated upward climb subjecting the passenger to sustained positive G forces. Rotation around the yaw axis provides the effect of G-forces on the body while the rotation around the G axis 242 allows for a realistic climbing simulation. FIG. 2C shows the passenger compartment in a horizontal but inverted position simulating sustained forward motion with the passenger subject to negative G forces as would be encountered during forward inverted flight.

Assuming a sufficient rate of rotation around the yaw axis, and by tilting the crew compartment 170 in the appropriate fashion around the G axis, a person in the crew compartment 170 can be subjected to multiple sustained positive or negative G forces resulting in a wide range of highly accurate flight simulation effects, e.g., effects which might be encountered in actual flight combat conditions.

Numerous variations on the above described flight simulators will be apparent to one of ordinary skill in the art in view of the above descriptions. Such simulators are to be deemed within the scope of the invention.

What is claimed is:

1. A flight simulator, comprising:
    a support assembly (104, 302) including a vertical actuator (330);
    a pitch boom (114) rotatably mounted in said support assembly thereby allowing said pitch boom to fully rotate around a pitch axis;
    a swing boom, rotatably mounted to said pitch boom, said swing boom being fully rotatable around a roll axis which is perpendicular to said pitch axis;
    a passenger compartment mounted to one end of said swing boom, said passenger compartment being offset from said pitch axis;
    a yaw motor secured to said support assembly (144, 302) for rotating said support assembly along with the passenger compartment around a yaw axis; and
    a vertical actuator (330) coupled by connecting linkage (332) to said pitch boom (114), said vertical actuator (330) being responsive to computer control to change the height of said pitch boom (114) during flight simulation to thereby simulate changes in altitude.

2. The flight simulator of claim 1, wherein said support assembly is of sufficient height to allow said pitch boom (114) to be moved multiple feet during a flight simulation while maintaining said passenger compartment (160) high enough off the ground that said passenger compartment can fully rotate around the pitch boom during the entire flight simulation.

3. The flight simulator of claim 2, wherein said vertical actuator (330) can move the pitch boom (114), in a vertical direction, at least 10 feet during a flight simulation.

4. The flight simulator of claim 2, further comprising:
    a horizontal support (304) upon which said support assembly (104, 302) is mounted; and
    a horizontal actuator (310) coupled to said horizontal support (304), said horizontal actuator (310) being responsive to computer control to change the height of said pitch boom (114) during flight simulation to thereby simulate sudden horizontal motion.

5. The flight simulator of claim 4, further comprising:
    wheels (306) attached to said horizontal support.

6. The flight simulator of claim 5, further comprising:
    rails (308), said wheels (306) riding on said rails (308) to thereby constrain horizontal motion of said flight simulator induced by said horizontal actuator (310) to be straight horizontal motion.

7. The flight simulator of claim 5, further comprising:
    a computer (111) including a control routine (113) used to control said vertical actuator (330) to simulate sudden changes in altitude during a simulated flight.

8. The flight simulator of claim 2, further comprising:
    a support arm (240) used to mount the passenger compartment to said one end of said swing boom,
    an additional boom (242), rotatably supporting said passenger compartment (160) in said support arm (240); and
    a motor (390) attached to said additional boom (242) for rotating said additional boom (242) and the attached passenger compartment (160) to subject the occupants of said passenger compartment (160) to sustained acceleration forces during a flight simulation as a function of the passenger compartment position and rate of rotation around the yaw axis.

9. A flight simulator, comprising:
    a support assembly (104, 302) including a vertical actuator (330);
    a swing boom, rotatably mounted to said support assembly, said swing boom being fully rotatable around a pitch axis which is perpendicular to said swing boom;
    a passenger compartment (170), mounted to one end of said swing boom;
    a support arm (240) used to mount the passenger compartment to one end of said swing boom, said passenger compartment being offset from said pitch axis;
    an additional boom (242), rotatably supporting said passenger compartment (170) in said support arm (240);
    a motor (390) attached to said additional boom (242) for rotating said additional boom (242) and the attached passenger compartment (160);
    a yaw motor (312) secured to said support assembly (144, 302) for rotating said support assembly along with the passenger compartment around a yaw axis;
    a pitch boom 114, said pitch boom (114) being used to rotatably mount said swing boom to said support assembly thereby allowing said pitch boom and said swing boom to fully rotate around the pitch axis; and
    a vertical actuator (330) coupled by connecting linkage (332) to said pitch boom (114), said vertical actuator (330) being responsive to computer control to change the height of said pitch boom (114) during flight simulation to thereby simulate changes in altitude.

10. The flight simulator of claim 9, further comprising:
    a horizontal support (304) upon which said support assembly (104, 302) is mounted; and
    a horizontal actuator (310) coupled to said horizontal support (304), said horizontal actuator (310) being responsive to computer control to change the height of said pitch boom (114) during flight simulation to thereby simulate sudden horizontal motion.

11. The flight simulator of claim 9, further comprising:
    a computer (111) including a control routine (113) used to control said vertical actuator (330) to simulate sudden changes in altitude during a simulated flight.

12. The flight simulator of claim 9, wherein said passenger compartment (170) is titled partially upward while being rotated around said yaw axis at a rate sufficient to simulate multiple sustained G forces on an occupant of said passenger compartment (170).

13. The flight simulator of claim 9, wherein said yaw motor (312) is sufficiently powerful to rotate said swing boom and attached passenger compartment (170) at a rotational rate sufficient to induce a centripetal acceleration on said passenger compartment (170) equal to multiple G forces.

* * * * *